Patented Nov. 6, 1934

1,979,628

UNITED STATES PATENT OFFICE 1,979,628

MONO ALKYL ETHERS OF 1,4-DIHYDROXY ANTHRACENE

Georg Kränzlein and Ernst Runne, Frankfort-on-the-Main-Höchst, Germany, assignors to General Aniline Works, Inc., New York, N. Y., a corporation of Delaware No Drawing. Application December 15, 1933, Serial No. 702,647. In Germany December 16, 1932

3 Claims. (Cl. 260—150)

The present invention relates to new compounds of the anthracene series; more particularly it relates to 1-hydroxy-4-alkoxy-anthracene compounds of the general formula:

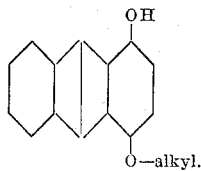

It is known that hydroxy-anthracene may easily be etherified to form the corresponding alkoxy-anthracenes by treating them with an alcohol and hydrochloric acid (see "Berichte der Deutschen Chemischen Gesellschaft", vol. 42, page 1415). If di-hydroxy-anthracenes are subjected to the said reaction in the usual manner, then the corresponding di-alkoxy-anthracenes are easily and smoothly formed. Mono-ethers of di-hydroxy-anthracenes, however, have not been known hitherto.

We have now found that 1-hydroxy-4-alkoxy-anthracenes are obtainable without difficulties from 1,4-dihydroxy-anthracenes by carrying out the etherification under considerably milder conditions as they were hitherto applied according to the literature cited. For instance, stirring of 1,4-dihydroxy-anthracene for a short time with methyl alcoholic hydrochloric acid at normal temperature has been found sufficient to form 1-hydroxy-4-alkoxy-anthracene. This result is surprising as it was not to be foreseen that the mono-ethers of dihydroxy-anthracenes could at all be prepared and isolated; it was rather possible that the dialkoxy-anthracenes would immediately be formed.

The 1,4-dihydroxy-anthracene used as starting material has been produced hitherto by reducing 1,4-anthraquinone, obtainable by oxidation of 1-hydroxy-4-amino-anthracene or 1,4-diamino-anthracene, and could only be isolated in the form of its diacetate. We have found that 1,4-dihydroxy-anthracene is easily obtainable by hydrolysis of 1-hydroxy-4-amino-anthracene, for instance by boiling the aqueous solution of the hydrochloride of the said amino compound or by boiling 1-hydroxy-4-amino-anthracene with mineral acids, with salts having an acid reaction, etc. The product, thus obtainable, is especially suitable for the formation of the mono-alkyl-ether according to the method disclosed.

The 1-hydroxy-4-alkoxy-anthracenes are valuable compounds for the production of dyes and other organic compounds.

The following examples serve to illustrate the invention, but they are not intended to limit it thereto; the parts being by weight:

(1) 10 parts of 1,4-dihydroxy-anthracene are introduced at room temperature into ten times their weight of a methyl alcohol solution of hydrochloric acid of 20 per cent. strength. The mixture is stirred until the solid matter has dissolved. The dark-green solution is immediately poured on ice; the yellow precipitate obtained is filtered by suction and washed with water until neutral. When the product is recrystallized, for instance, from ethyl alcohol of 50 per cent. strength, greenish-yellow crystals, melting at 131° C. to 132° C. are obtained. The crystals dissolve in caustic soda solution to a yellow solution which assumes at the air by oxidation a bluish-green coloration. The new compound corresponds to the following formula:

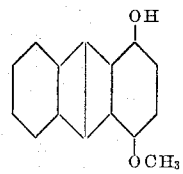

(2) By substituting in Example 1 an ethyl alcohol solution for the methyl alcohol solution of hydrochloric acid, the corresponding monoethyl-ether is obtained which has the following formula:

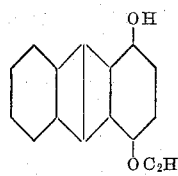

The properties of the new compound are similar to those of the methyl ether. Its melting point is at 152° C. to 153° C.

(3) 73 parts of methyl alcohol are mixed with 27 parts of sulfuric acid monohydrate while cooling with ice. 10 parts of 1,4-dihydroxy-anthracene are added and the mixture is stirred for some time at room temperature. When most of the solid matter has dissolved, the whole is filtered by suction; the filtrate is mixed with ice and the precipitate obtained is worked up as described in Example 1. The monomethyl ether is thus likewise obtained.

By using instead of methyl alcohol or ethyl alcohol other aliphatic alcohols, for instance, propyl alcohol, butyl alcohol and even higher alcohols, and applying suitable reaction conditions, the corresponding mono-alkyl-ethers of 1,4-dihydroxy-anthracene are obtained.

We claim:

1. 1-hydroxy-4-alkoxy-anthracenes of the general formula:

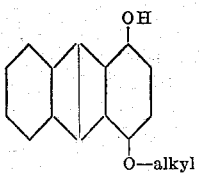

which compounds are soluble in alkalies and are easily oxidizable in these solutions.

2. The compound of the formula:

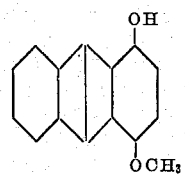

forming greenish-yellow crystals when recrystallized, for instance, from ethyl alcohol of 50 per cent. strength, melting at 131° C. to 132° C., dissolving in caustic soda solution to a yellow solution which assumes in air by oxidation a bluish-green coloration.

3. The compound of the formula:

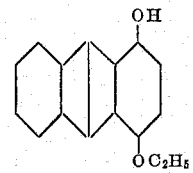

forming greenish-yellow crystals when recrystallized, for instance, from ethyl alcohol of 50 per cent. strength, melting at 152° C. to 153° C., dissolving in caustic soda solution to a yellow solution which assumes in air by oxidation a bluish-green coloration.

GEORG KRÄNZLEIN.
ERNST RUNNE.